US012659339B2

(12) United States Patent
Shetty

(10) Patent No.: US 12,659,339 B2
(45) Date of Patent: Jun. 16, 2026

(54) RECORDING SECURITY MANAGEMENT

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 287 days.

(21) Appl. No.: 18/376,849

(22) Filed: Oct. 5, 2023

(65) Prior Publication Data

US 2025/0030721 A1     Jan. 23, 2025

(30) Foreign Application Priority Data

Jul. 20, 2023     (IN) .............................. 202341048933

(51) Int. Cl.
    H04L 9/40         (2022.01)
    G06F 21/62        (2013.01)
(52) U.S. Cl.
    CPC ...... H04L 63/1433 (2013.01); G06F 21/6218 (2013.01)
(58) Field of Classification Search
    CPC .......................... H04L 63/1433; G06F 21/6218
    See application file for complete search history.

(56) References Cited

U.S. PATENT DOCUMENTS 6,850,609 B1 * 2/2005 Schrage .................. G10L 15/26
                                                          704/235
9,712,569 B2 * 7/2017 Vashishtha .......... H04L 65/4015

11,699,113 B1 * 7/2023 Pearson ................. G06V 20/41
                                                          707/609
12,299,643 B2   5/2025 Liu
12,314,910 B2 * 5/2025 Chakraborty ........... G06F 40/20
2006/0101020 A1   5/2006 Aaron
2007/0285504 A1 * 12/2007 Hesse ...................... H04N 7/15
                                                          348/E7.083
2008/0133600 A1 * 6/2008 Uehori ................... G06Q 10/10
2008/0159495 A1 * 7/2008 Dahan ................. H04M 3/4938
                                                          379/93.01
2010/0158232 A1 * 6/2010 Sylvain ............... H04L 65/4038
                                                          379/202.01

(Continued)

FOREIGN PATENT DOCUMENTS

WO          2023/009240 A1     2/2023

OTHER PUBLICATIONS

Cranshaw et al. "Calendar.help: Designing a Workflow-Based Scheduling Agent with Humans in the Loop," Proceedings of the 2017 CHI Conference on Human Factors in Computing Systems, pp. 2382-2393, 2017.

(Continued)

*Primary Examiner* — Jason Chiang
(74) *Attorney, Agent, or Firm* — Kim & Stewart LLP

(57)                 ABSTRACT

Disclosed are various embodiments for preventing unauthorized access to materials and topics for meeting invitations and meeting recording. A meeting recording and other meeting data is received in association with a meeting identifier. The meeting recording and the meeting data is provided as input to a machine learning engine to generate labelled recording data. A user-specific recording package is generated to include data limited to the at least one meeting section corresponding to a set of security labels approved for a user account.

20 Claims, 5 Drawing Sheets

(56) References Cited

U.S. PATENT DOCUMENTS

| | | | | |
|---|---|---|---|---|
| 2013/0258043 A1* | 10/2013 | Amano | | H04L 12/1831 |
| | | | | 348/14.08 |
| 2014/0185492 A1* | 7/2014 | Liu | | H04M 3/00 |
| | | | | 370/260 |
| 2015/0085707 A1* | 3/2015 | Shi | | H04L 12/1831 |
| | | | | 370/261 |
| 2016/0224803 A1* | 8/2016 | Frank | | G06F 21/6245 |
| 2017/0308866 A1 | 10/2017 | Dotan-Cohen et al. | | |
| 2018/0046957 A1* | 2/2018 | Yaari | | G06Q 10/109 |
| 2018/0130179 A1* | 5/2018 | Wang | | G06F 18/22 |
| 2019/0108686 A1* | 4/2019 | Spivack | | G06Q 30/0277 |
| 2022/0013114 A1* | 1/2022 | Camenares | | G06N 20/00 |
| 2022/0138634 A1 | 5/2022 | Covell et al. | | |
| 2022/0206673 A1* | 6/2022 | Zhan | | G11B 27/031 |
| 2022/0272132 A1* | 8/2022 | Ahmed | | H04L 65/1083 |
| 2022/0309037 A1* | 9/2022 | Gutierrez | | G06F 16/16 |
| 2022/0385758 A1* | 12/2022 | Tadesse | | G10L 25/51 |
| 2023/0178079 A1* | 6/2023 | Tran | | G06N 20/00 |
| | | | | 704/200 |
| 2023/0282218 A1 | 9/2023 | Moynihan et al. | | |
| 2023/0289126 A1* | 9/2023 | Minagawa | | G06F 3/1454 |
| 2023/0410004 A1* | 12/2023 | Varghese | | G06Q 10/06312 |
| 2024/0031653 A1* | 1/2024 | Ozaki | | H04N 21/4312 |
| 2024/0054430 A1* | 2/2024 | Maikhuri | | G06F 40/30 |
| 2024/0087606 A1* | 3/2024 | Miller | | H04N 7/155 |
| 2024/0163399 A1* | 5/2024 | Jaiswal | | H04L 12/1831 |
| 2024/0223726 A1* | 7/2024 | Dotan-Cohen | | H04N 7/147 |
| 2024/0311773 A1* | 9/2024 | Maikhuri | | G06Q 10/1093 |
| 2025/0016517 A1* | 1/2025 | Jukic | | H04S 7/305 |

OTHER PUBLICATIONS

Non-Final Office Action mailed Jun. 4, 2025 in U.S. Appl. No. 18/376,844, 14 pages.

Final Office Action mailed Dec. 2, 2025 in U.S. Appl. No. 18/376,844, 17 pages.

* cited by examiner

200

RECORDING SECURITY MANAGEMENT

RELATED APPLICATIONS

Benefit is claimed under 35 U.S.C. 119(a)-(d) to Foreign application No. 202341048933 filed in India entitled "RECORDING SECURITY MANAGEMENT", on Jul. 20, 2023, by VMware, Inc., which is herein incorporated in its entirety by reference for all purposes.

The present application is related in subject matter to U.S. patent application Ser. No. 18/376,844 which is incorporated herein by reference.

BACKGROUND

Organizations conduct business meetings for discussing information with a group of users. Meetings can form the backbone of an enterprise and are key to innovation, conflict resolution and business decisions. Discussions can include vivid oral discussions and whiteboarding of sensitive topics. However, meetings can be prone to data leaks of content shared by events such as eavesdropping, visual spying, and the like.

In the hybrid mode of working, many meetings are conducted using remote or network conferencing tools. Meetings can be recorded in many cases especially when attendees are unable to attend a call either due to time zone issues, schedule conflicts, or when information may be relevant to review. While the meeting organizer and participants may be careful about discussing sensitive and confidential matters on a live call based on the attendees, there are times when information is inadvertently recorded or presented. For example, informal discussions before most attendees arrive, during an intermission, or after most attendees leave can include information that should not be shared via recording or otherwise. As a result, a recording can include a small snippet of sensitive discussion that was forgotten, ignored, or presented to a limited live audience can later be shared through circulation of a recording. As a result, there is a need for security management for meetings and recordings.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to preventing unauthorized access to material presented in a meeting. Organizations conduct meetings for discussions with a group of users. In some cases, these meetings are restricted to a limited set of users because confidential information is being shared during the meeting. Discussions can include vivid oral discussions and whiteboarding of sensitive topics. However, meetings can be prone to data leaks of content shared by events such as accidental sharing of meeting recordings, eavesdropping, visual spying, and the like.

In the hybrid mode of working, many meetings are conducted using online remote or network conferencing tools. Whether meetings are in person or online, meetings can be recorded. The recordings can be a valuable resource when attendees are unable to attend a call as a result of time zone issues and schedule conflicts. Recordings can also include information that is relevant for review purposes. While the meeting organizer and participants may be careful about discussing sensitive and confidential matters on a live call based on the attendees, there are times when information is inadvertently recorded or presented. For example, informal discussions before most attendees arrive, during an intermission, or after most attendees leave can include information that should not be shared via recording or otherwise. As a result, a recording can include a small snippet of sensitive discussion that was forgotten, ignored, or presented to a limited live audience can later be shared through circulation of a recording. As a result, there is a need for security management for meetings and recordings.

The present disclosure describes mechanisms that can prevent unauthorized access to sensitive material by predicting meeting security levels for meetings, assessing security levels in recorded meetings, and providing recommendations that modify meeting access both before and after the meeting. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
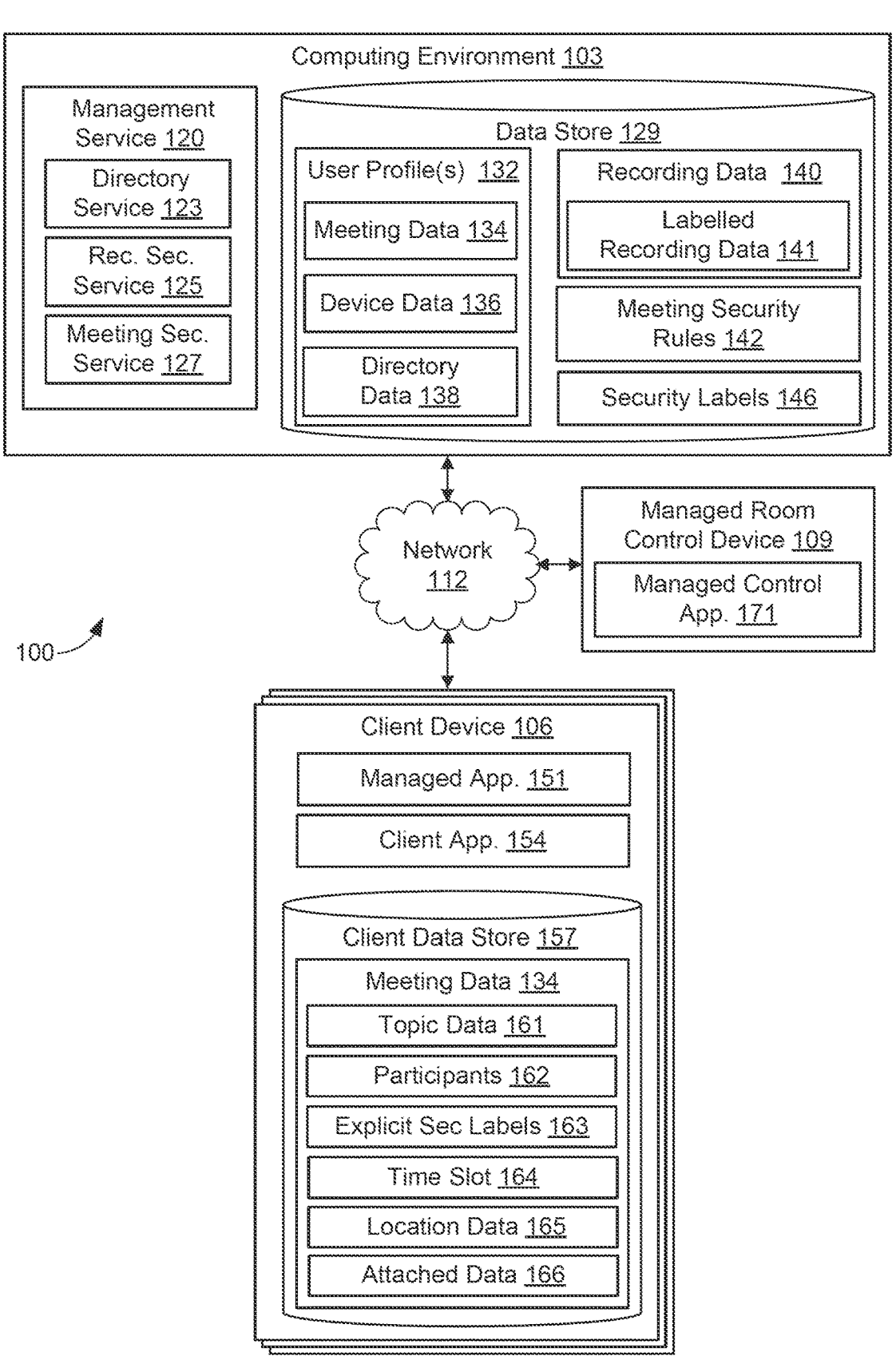
FIG. 1 is a drawing of a network environment according to various embodiments of the present disclosure.

With reference to FIG. 1, shown is a network environment 100 according to various embodiments. The network environment 100 can include a computing environment 103, a client device 106, and a managed room control device 109, which can be in data communication with each other via a network 112. The managed room control device 109, the meeting room device 209, the client device 106 can represent a meeting room environment, which can be managed by the managed room control device 109 and/or the client device 106.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLU-ETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include one or more computing devices that can include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

The computing environment 103 can include a management service 120 that manages aspects of enterprise resource access, and also performs client device 106 security management. The management service 120 can include a directory service 123, a recording security service 125, and a meeting security service 127. The management service 120 can be executed to manage the operation of remote meeting or network conferencing software and a meeting room environment. The management service 214 can transmit one or more meeting policies to the managed room control device 109, the meeting room devices, and/or the client device 106. The meeting policy can be used to direct devices in the meeting room environment to enforce a particular remedial action based on a set of conditions occurring in the meeting room. The meeting policy can be specified by user (e.g., administrative user).

The directory service 123 can be executed to access credential and permissions for the user profile 132. In some examples, the management service 120 can access or invoke the directory service 123 to verify an identity of a user and the access level/permissions for the user to access resources (e.g., network conferencing software, meeting rooms 103, network resources, meeting room devices, etc.).

Network conferencing software can be used to provide both remote and in-person attendees with a digital viewing and presentation tools, as well as the ability to record a meeting. The network conferencing software can include, be part of, or be integrated with the recording security service 125. The conferencing software can include client applications 154, software executed using the computing environment 103, as well as third party network services. The network conferencing software can also be executed using the managed room control device 109. The network conferencing software can record a meeting, and the components of the management service 120, such as the recording security service 125, can download or receive a copy of the meeting recording and store it as a raw or unmodified meeting file in the recording data 140.

A meeting room environment can represent a networked area within a meeting room. The meeting room environment can include a managed room control device 109, meeting room devices controlled by the managed room control device 109, client devices 106, and other suitable components in data communication via the network 112. In some nonlimiting examples, the managed room control device 109 can be in data communication with the computing environment 103. The managed room control device 109 can provide data to the computing environment 103 and can receive commands from the computing environment 103. The managed room control device 109 can enforce the commands on the meeting room devices and/or the client device 106. Each managed room control device 109 can manage one or more meeting room environments 215.

Various data is stored in a data store 129 that is accessible to the computing environment 103. The data store 129 can be representative of a plurality of data stores 129, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store 129. The data stored in the data store 129 is associated with the operation of the various applications or functional entities described below. The data in the data store 129 can include user profiles 132, recording data 140, meeting security rules 142, security keywords 144, security labels 146, and other data.

The user profile 132 can include meeting data 134, device data 136, and directory data 138 among other information. The meeting data 134, device data 136, and directory data 138 can also be stored separately from the user profile 132, and can be associated with one or more unique user identifiers for users that are associated with the meetings, devices, and directory information. The user profile 132 can represent an account or a profile for each user that has enrolled with a management service of the computing environment 103. Each user profile 132 can include user credentials and a unique identifier to distinguish it from other user profiles 132. Additionally, the user profile 132 can include meeting data 134 and device data 136.

The device data 136 can represent data associated with the client device 106 of an enrolled user with the management service. The device data 136 can include a unique device identifier, such as a phone number, a device serial number, an International Mobile Equipment Identity (IME) number, a unique identifier for an operating system, and other suitable device identifiers. The device data 136 can include a list of hardware components for the client device 106, a list of software (e.g., applications) installed on the client device 106, an operation system (e.g., version number, etc.), compliance checks performed, a device department group (e.g., marketing group, engineering testing group, executive officer status, etc.), and other suitable data. The device data 136 can include location data provided by the client device 106 and the locations of nearby (e.g., within a threshold distance) client devices 106.

A control device profile can represent data associated with a particular managed room control device 109 located in a particular meeting room, according to one or more meeting security rules 142. The control device profile can include meeting room data 236, event data 239, and other suitable data. The meeting room data 236 can include a list of meeting room devices that the managed room control device 109 is managing or controlling in the meeting room, data associated with the meeting that are scheduled to be conducted in the meeting room (e.g., time slot, invited attendees, presentation material, a meeting type), and other suitable meeting room data.

The directory data 138 can represent data that associated with credentials, permissions, and access associated with each user profile 132. For instances, the directory data 138 can include login credentials, passwords, and other suitable data for authenticating an identity of a client device 106 requesting access to a resource in the computing environment 103 and/or the meeting room environment. In some examples, the directory data 138 can represent data stored in association with the Active Directory from Microsoft®.

Various applications or other functionality can be executed in the computing environment 103. The components executed on the computing environment 103 include a management service 120, a directory service 123, and other applications, services, processes, systems, engines, or functionality not discussed in detail herein.

The recording data 140 can include unmodified or original meeting recording files, such as audio files, video files, textual transcripts, and so on. While the original recording files can include transcripts received with the audio or video meeting recording, the recording security service 125 can also generate a textual transcript based on the original audio or video. The recording data 140 can also include labelled recording data 141. The labelled recording data 141 can include modified meeting recording files generated using the recording security service 125. The labelled recording data 141 can include audio files, video files, and textual transcripts timestamped with security labels 146 that apply to a specified timestamp or range of time according to a beginning timestamp and ending timestamp.

The recording security service 125 can also highlight or otherwise emphasize portions of a textual transcript to specify a particular security label 146 that applies to keywords or phrases according to meeting security rules 142. The recording security service 125 can also extract images from the video files, analyze the images using textual recognition and object recognition of sensitive or confidential information such as words, phrases, objects, and images. The recording security service 125 can apply a particular security label 146 to one or more of the images. The recording security service 125 can apply security labels 146 to the audio or video recording using the timestamps associated with confidential information identified using the transcripts and image data.

The meeting security rules 142 can include rules for which users can have access to labelled recording data 141 according to security labels 146. For example, the meeting security rules 142 can map a user profile 132 or a group to enable or disable access to certain security labels 146. The management service 120 can provide a user interface through which an administrative user can enable or disable a user or group to access data associated with a set of security labels 146.

The security labels 146 can refer to labels that provide information such as a security level or security type. While a security level or value can be indicated by some security labels 146, others can indicate a security topic or type. A security type and a security level or value can be provided in a single security label 146. The security labels 146 can include any customized set of security labels 146, or a default set of security labels 146. For example, one nonlimiting set of security labels 146 can include "confidential," "secure," and "normal" security labels 146, in order of reducing security level. However, additional or fewer labels 146 can be included in a set of predetermined security labels 146.

The recording security service 125 can include a service that stores, analyzes, and applies a set of one or more security labels 146 to meeting recordings in order to generate labelled recording data 141. The recording security service 125 can include a classifying algorithm, grouping algorithm, or another machine learning algorithm to apply the set of security labels 146 to particular timestamps or ranges of timestamps. The recording security service 125 can train the machine learning algorithm or engine using a history of meeting invitations that are associated with respective security labels 146, as well as training data that associates security labels 146 with keywords, phrases, audio snippets, and respective items of meeting data 134.

The recording security service 125 can take the original audio, video, and textual transcripts, as well as meeting data 134, device data 136, directory data 138 as inputs to the machine learning algorithm to output the labelled recording data 141. The recording security service 125 can provide this information back to an administrator for feedback. The feedback can be used to train the machine learning algorithm, for example, by adjusting weights and other parameters of the algorithm according to accepted, rejected, shifted timestamp location, and otherwise modified security labels 146.

The recording security service 125 can generate user-specific materials that exclude snippets of audio, video, and textual transcripts that include sensitive information. The recording security service 125 can additionally or alternatively blur, blank, or otherwise obscure frames of video, images in attachments, and other materials identified to include sensitive information. As a result, the recording security service 125 can ensure that the user-profile-appropriate materials are circulated and provided for email or console user interface access.

The meeting security service 127 can include a service that stores, analyzes, and applies a set of one or more security labels 146 to meeting invitations. The meeting security service 127 5 can include a machine learning service that uses a classifying algorithm, grouping algorithm, or another machine learning algorithm to identify and apply security labels 146 to meeting invitations. The meeting security service 127 can also apply security profiles to managed room control devices 109 according to the security labels 146. The meeting security service 127 can provide this information back to an administrator for feedback. The feedback can be used to train the machine learning algorithm, for example, by adjusting weights and other parameters of the algorithm according to accepted, rejected, and modified security labels 146 for meeting invitations.

The meeting security service 127 can further suggest modifications to the topic data 161, participants 162, time slot 164, location data 165, attached data 166 and other meeting data 134. For example, if the participants 162 include individuals who are similarly situated to previous individuals that are not permitted to discuss a particular topic, attachment, or are typically not allowed to attend a meeting at a particular time slot 164 or location data 165, then the meeting security service 127 can suggest a modification of one or more of the topic data 161, participants 162, time slot 164, location data 165, attached data 166 and other meeting data 134 so that the meeting data 134 includes fewer or no conflicts according to meeting security rules 142 and security labels 146. Meeting security rules 142 can associated with certain security labels 146 with individual items or types of topic data 161, participants 162, time slot 164, location data 165, attached data 166 and other meeting data 134. The meeting security service 127 can suggest a modification of meeting security rules 142 as well, in view of feedback data from administrative users.

The client device 106 is representative of a plurality of client devices that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top blockes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a managed application 151, one or more client applications 154, and other executable instructions. The managed application 151 can be executed in order to facilitate control of the operation of the client device 106 by the managed control application 259 and/or the management service 120. The managed application 151 can receive instructions or commands from the managed room control device 109 and/or the computing environment 103 (e.g., the management service 120). The managed application 151 can be downloaded and installed during an enrollment process with the management service 120.

The client application 154 can be executed in a client device 106 to access network content served up by the computing environment 103 or other servers, thereby rendering a user interface on the display. To this end, the client application 154 can include a browser, an email application, a calendar application, a dedicated application, or other executable, and the user interface can include a network page, an application screen, or other user mechanism for obtaining user input. The client device 106 can be configured to execute applications beyond the client application 154, such as email applications, calendar applications, social networking applications, word processors, spreadsheets, or other applications. In some examples, client application 154 can be integrated with the management service 120 to communicate various data directly or indirectly with the management service 120. Indirect communication can include communication using the managed application 151 or a third party network service.

Various data is stored in a client data store 157 that is accessible to the client device 106. The data stored in the client data store 157 is associated with the operation of the various applications or functional entities described in association with the client device 106. The data in the client data store 157 can include meeting data 134 for a user of the client device 106. The meeting data 134 can represent data associated with calendar meetings. The meeting data 134 can include meeting topic data 161, participants 162, explicit security label 163, time slot 164, location data 165, and attached data 166.

Meeting topic data 161 can include a subject, agenda, and body text and images created for a meeting invitation. Participants 162 can indicate particular users as organizers, presenters, attendees, recipients, and other information. The organizer can refer to the user who creates the meeting invitation, as well as other administrative users. Participants 162 that are presenters can refer to users who are slated to present information in person or using network conferencing software. Participants 162 that are attendees can refer to users who are specified to attend in person or using network conferencing software. Participants 162 that are recording recipients can refer to users that are specified to receive a recording after the meeting is completed. In some examples, recording recipients do not receive a meeting invitation to the live meeting, while invitees include presenters, organizers, and attendees that receive a meeting invitation. In other words, the participants 162 can include a list of invitees and a list of recording recipients.

The explicit security label 163 can be a user-selected one of the security labels 146 that is selected by the individual arranging the meeting during meeting invitation creation. The time slot 164 can refer to a period of time selected for the meeting, including duration as well as start and end times. The location data 165 can indicate one or more of a room, a building, a particular make or type of network conferencing software to use, settings for the network conferencing software, and other information about where and how the meeting is to be held whether in person or electronically. Attached data 166 can include information that is attached to the meeting invitation as a link or and attachment. Attached data 166 can include content of websites provided by a network address link, or download materials to be accessed using the network address link.

The management service 120 can recommend modifications to any of these items of meeting data 134. Before the meeting occurs, the meeting security service 127 can generate recommendations and apply modifications to the meeting invitation, security profiles for the managed room control device 109, and meeting data 134 for the meeting. After the meeting occurs, the recording security service 125 can generate recommendations and apply modifications to generate user-specific labelled recording data 141, and modify the machine learning algorithms of the meeting security service 127. The recording security service 125 can identify and utilize the recording data 140, actual participants, actual duration and time, and other information in addition to the meeting data 134.

The managed room control device 109 can be used to manage or control the meeting room environment. The managed room control device 109 can be used to control the operations of the meeting room devices and/or the client devices 106 located in the meeting room. The managed room control device 109 can be used for offloading computing and management tasks from the computing environment 103 and for providing faster responses to data sources in the meeting room environment. For example, the managed room control device 109 can be used to provide faster responses for requests from the meeting room devices or a client device 106 than the computing environment 103. In some examples, the managed room control device 109 can be representative of an edge control device, an edge server, or other suitable computing devices at situated at an edge of a particular network. In some examples, the managed room control device 109 can be a personal computer, laptop, a tablet, and other suitable computing devices. Additionally, the managed room control device 109 can be situated in the meeting room, on the same floor as meeting room, offsite from the meeting room, and at other suitable locations.

The managed room control device 109 can include a managed control application 259 that is associated with the management service 120. The managed control application 259 can be executed to enforce a meeting room security policy on the meeting room devices and/or the client devices 106 in a meeting room of the managed room control device 109. The meeting room policy can be specified by a user (e.g., an administrative user). The meeting room policy can include instructions for enforcing a remedial action in response to detecting a set of conditions (e.g., an uninvited user detected, a host or presenter has a left the room) occurring in the meeting room environment.

The meeting room devices can represent IoT devices that are located in the meeting room. Some examples of meeting room devices can include a display device (e.g., projector), a speaker (e.g., a conference speaker), a microphone, a lighting device, a thermostat device, electronic controlled window blind, a wireless access point, a camera (e.g., image camera, thermal camera), beacon devices and other suitable devices.

The meeting room devices can include a managed application 151 that is associated with the management service 120. The managed application 151 can receive instructions from the management service 120 and/or the managed room control device 109. The instructions can be used to enforce a particular remedial action for a set of conditions that have been detected in the meeting room environment. The remedial action can be determined based on a device type associated with the meeting room device 209. For instance, the managed room control device 109 can determine to place the meeting room devices in a suspension mode, in which the suspension mode is determined based on a set of detected conditions in the meeting room environment. The suspension mode for a display device can include a different action (e.g., turn off display) from a lighting device (e.g., dim the light in the meeting room).

The following provides a general description of the operation of the components of the networked environment 100. The components of the networked environment 100 can identify meeting data 134 from a meeting invitation and apply security labels 146 and other recommended updates for the meeting invitation, pre-meeting configuration of room and conferencing software profiles, as well as post-meeting recordings. Each meeting invitation, and each recorded meeting can be analyzed and associated with one or more security label 146 from a predetermined set of security labels 146. In one example, the predetermined set of security labels 146 an include: Confidential, Secure, Normal. Confidential can indicate that the meeting invitation or recording (or portion thereof) is limited to enterprise users over a predetermined threshold level in a company hierarchy. Secure can indicate that the meeting invitation or recording (or portion thereof) is limited to enterprise users who are full time employees, or full time employees in a particular team or user group. Normal can indicate no special restriction on users.

The meeting security rules 142 can map each of the security labels 146 to (1) a configuration profile for a room, (2) a conferencing software profile, (3) actions to perform to send out meeting invitations using a predetermined set of programmatic instructions that can send email, instant message, calendar, application, console user interface, and other types of invitations with specified software (4) actions to send or provide access to user-specific, group-specific, or security-label-specific recordings using a predetermined set of programmatic instructions that can provide email, instant message, application, console user interface, and other types of recording access with specified software.

A security label 146 can also be shown prominently as an overlay on a conferencing software user interface, a call recording user interface if provided using customized recording viewer software, within a recording file, and so on. The management service 120 and the managed application 151 can also enable a warning to users when the user copy-pastes call recording details into an email, webpage, or chat provided using the managed application 151 or a client application 154.

The following provides a more informal description of one example of the operation of the components of the networked environment 100 in processing a recording. Employee A records a conferencing software call with fellow managers and architects which deals with the topic of kickstarting a new project. During the course of the technical discussion, the discussion deviates to staffing and a brief mention is made about promotions, demotions, layoff, and so on. After the meeting, employee A receives an email which indicates the cloud recorded meeting is now ready for access along with access credentials such as password.

The management service 120 or a subcomponent obtains information about the recorded meeting. For example, the management service 120 or the management application 151 intercepts an email indicating the recording is ready. This can be performed by polling a conferencing software application programming interface (API) or network service API to check if any recorded meetings are available for the user. The management service 120 uses the permissions provided by the user as an opt-in, opt-out, or other process to access the meeting recording. As part of detecting the privacy level and appropriate security label(s) 146 for a recorded call, a machine learning engine of the management service 120 examines aspects of the recording. These aspects can also be applied to meeting invitations in a meeting invitation scenario.

Participants 162 in the recording. The actual and invited participants 162 in the original call can play an important role in designating a security level to the meeting. The participants 162, and additional enterprise hierarchy level, group, and user profile 132 information about each participant can be obtained using an Active Directory Integration. For example: A meeting with participants at Director or Senior Manager or any other higher levels can be more likely to be secure or confidential than one with engineers. Accordingly, based on the designations of the participants, a meeting can be designated as a candidate for a higher level of confidentiality. Similarly, a note can also be made whether the meeting included any contracted or temporary workforce, or was limited to full-time employees as participants 162.

Another point to be noted would be if the meeting had any enterprise-external partners such as consultants in attendance or listed as presenters. If enterprise-external partners are included, the organizations they belong to and their respective associated security level or label associations can be identified.

Topic data 161 such as agenda and subject of the meeting can also be considered. The management service 120 can use the subject and the agenda of the meeting invitation as an indicator of the purpose and security labels 146 for the meeting. In some cases, meeting creators or organizers can designate tags such as "Confidential", "Restricted" "Internal-only" and so on in the subject/agenda of the meeting. In some cases these security tags or explicit security labels 163 can be the same as the security labels 146. However, the explicit security labels 163 can additionally or alternatively be applied textually, or can be tags or labels provided by meeting or calendar software and other client applications 154.

Analysis of the topic data 161 and explicit security labels 163 thus provides management service 120 with valued information that can reliably predict and assess the confidentiality level and security labels 146 of the meeting invitation and/or recording, according to the creator of the meeting. Moreover, additional words and phrases such as "Promotions", "Acquisitions", "Deals" and so on can be analyzed as part of the topic data 161 whether in the subject line, body, or otherwise included in the meeting invitation or recording transcript or chat and discussion log. This topic data 161 can be an expandable set based on the domain where the solution is deployed.

The management service 120 can pair and analyze the topic data 161 along with the participants 162 to provide a better context to predict the confidentiality levels and apply security labels 146 to a meeting invitation, a meeting recording or a portion thereof. For example, a presenter or organizer can send a meting invite to a set of attendees limited to managerial or higher levels of an enterprise hierarchy, with the topic data 161 containing mentions of terms such as "Promotions" or "Deal Insights." This meeting invitation, a meeting recording or a portion thereof can be identified as more confidential than a meeting with similar terms in topic data 161 mentioned but including participants 162 containing junior level employees and temporary workforce.

Explicit security labels 163 designating a meeting with one of the predetermined security labels 146 or even another provided tag can serve as a high-level input and feedback for the machine learning algorithms. This can include comparison to similarly situated past meetings and training data. Recordings and invitations that include explicit security labels 163 identified in a history of enterprise recordings and invitations can be used as training data. The measure of confidentiality provided directly by the user can also be used as a continuous feedback system.

The management service 120 can also use attached data 166, including content shared in a meeting invitation as links and attachments to identify security labels 146. Once a meeting is recorded, additional content such as meeting chat logs, links, and attachments provided during the meeting can be analyzed as attached data 166. The management service 120 can also identify files and images shared during the meeting using a screenshare, and attachments subsequently forward in an email chain as a response to the meeting invite email on the conclusion of the meeting can also be analyzed. The email chain and attachments and textual information in the body and subject lines can be identified using the management service 120 directly, or can be received from the managed application 151 of the client devices 106 enterprise users. Additionally or alternatively, the various types of attachments such as invitation attachments, meeting attachments, and meeting email chain attachments can also be analyzed for potential inclusion in a recording package for a particular recording recipient.

The management service 120 can analyze the specific recipients of the email in the chain to identify whether the attached data 166 is to be used to affect the security label 146 of the entire meeting, or whether the attached data 166 is to be limited to user-appropriate recording packages for higher-level users. For example, if the reply chain is limited to higher-level users in the enterprise hierarchy, but the original meeting invitation includes lower-level users, then the management service 120 can tend to reduce the effect on the overall meeting security label 146. However, the management service 120 can apply a higher or more limited security label 146 to the attachment itself and can limit its distribution to user-appropriate recording packages for users that have access to the security label 146.

The management service 120 can also perform a detailed analysis of the meeting recording. The recording security service 125 can include a language identifying machine learning engine, which can include a transformer based engine that analyzes the meeting recording and generates a textual transcript. The transcript can then be analyzed in greater detail via further processing steps using the same or another machine learning engine. The overall machine learning process can involve keyword detection, categorization, and sentiment analysis. Sentiment analysis can provide valuable context by analysis of the tone, volume, and environmental sounds, as well as the text itself to identify emotional tone as positive, negative, or neutral in the recording for a particular timestamped duration. The management service 120 can use the output of the machine learning process in conjunction with rule-based factors to provide timestamped security label 146 information to the call recording.

The machine learning cycles of the management service 120 can include keyword detection. Keyword detection allows detection of any keywords or sensitive words utilized in meeting invitations and during the course of the meeting recordings. Keywords can range from general keywords such as "Secure", "Trade secret", "patents" and so on. The management service 120 can generate, modify, or access a curated general corpus of words and phrases that signify importance, breakthroughs, innovations, trade secrets, deals and so on. While these can be used for a security level, they can also trigger group or team-specific security labels 146 such as legal team, development team, outreach team, human resources, and so on. For keyword detection, the management service 120 can use a machine learning model and train it using a general training dataset of corporate communications. The management service 120 can use supervised training to tune the granularity of the detection. For industry specific keywords, admins can be allowed to perform an additional round of training for keywords specific to that particular organization or industry. The management service 120 can also identify explicit mention of phrases such as "Do not forward", "Confidential", "For your eyes only" etc. that are displayed in images and video or spoken during the meeting. The management service 120 can utilize these terms, phrases and syntactic equivalents provide a good measure of whether a meeting or phases of the meeting are secure.

The machine learning cycles of the management service 120 can also include sentiment analysis. Sentiment analysis serves the important purpose of rating the sentiments displayed in a call, but also for an invitation and pre-meeting email chain stored as meeting data 134. Post-meeting email chains can be stored as recording data 140. In some examples, the recording data 140 can be considered and stored as a subset of the meeting data 134. The management service 120 can use an identified sentiment level or score to detect any outbursts or ill-tempered sentiment and can be used to extract ill-tempered snippets and prevent overall recordings from being forwarded. The recording security service 125 can include a combined or separate text and audio analysis to identify timestamped security labels 146 for the meeting recording. However, textual machine learning sentiment analysis used by the meeting security service 127 to identify textual sentiment expressed in invitation and pre-meeting email chain. The management service 120 can use this information to generate meeting security recommendations for review before the meeting occurs, as well as recording security assessments for review after the meeting.

As indicated earlier, security labels 146 can include different types or categories. The management service 120 can provide multiple levels or rounds of analysis for the different types of security labels 146. The management service 120 can logically perform the rounds of analysis sequentially, or with full or partial concurrence. For example, the management service 120 can provide classification of meeting invitations and recordings into a first set of various group, team, or topic-based security labels 146 such as technical, managerial, sales, and so on. The management service 120 can additionally provide classification of meeting invitations and recordings into a second set of security, importance, or enterprise hierarchy level based security labels 146 such as Confidential, Secure, and Normal.

In one example, the management service 120 can identify the first set of security labels 146 based on a first subset of meeting data 134 such as topic data 161, participants 161, and potentially other items of the meeting data 134 such as attached data 166. The management service 120 can identify the second set of security labels 146 based on all meeting data 134, or a subset that includes additional factors such as topic data 161, explicit security labels 163, time slot 164, location data 165, attached data 166, and the recording data 140 in the case of generating labelled recording data 141.

The management service 120 can use the meeting security service 127 to associate a meeting identifier with one or more security label 146 prior to the meeting and store in a table or other data structure in the data store 129. The management service 120 can use the recording security service 125 to associate a recording with the meeting identifier and generate labelled recoding data 141 and recording packages for various users and groups. The labelled recording data 141 can be stored in the data store 129 in association with the meeting identifier.

The management service 120 can share meeting invitations and labelled recoding data 141 using a network conferencing solution such as ZOOM™, or another network video conferencing service. The management service 120 can also use a bespoke software provided using a console user interface of the management service 120 or the managed application 151, and can generate recording files for circulation. The management service 120 can transmit messages, notifications, emails, and other communications. For invitations, the management service 120 can provide a universal resource identifier or link (URI or URL) or other network address for labelled recoding data 141 for participants 162 who are to attend the meeting. For recordings, the management service 120 can include a network address for labelled recoding data 141 for participants 162 who are recording recipients.

When a user copies and pastes a meeting invitation or recording details in an email or webpage, a management-service-provided software development kit (SDK) of the managed application 151 (or a console interface of the management service 120) can (1) identify a meeting URL and extracts a meeting identifier, (2) extracts a privacy level of the meeting if appended to the URL, (3) if a privacy level or other explicit security label 163 is unavailable, the extracted meeting ID can be compared to a table or other data structure maintained by the management service 120, and the corresponding security label 146 generated for the meeting can be extracted.

The managed application 151 or the management service 120 can generate or identify a warning to display to the user based on the security label 146. The warning can be generated and displayed in a user interface relative to or adjacent to the recipients to whom the user is sending the recording details.

As described above, the management service 120 can also perform confidential segment detection and apply timestamped security labels 146 to indicate which segments of a meeting recording are sensitive or are relevant to a particular team, group, or topic. This granularity allows the management service 120 to generate labelled recording data 141 that includes several labelled snippets such that each snippet can be forwarded or omitted for a particular target audience. The management service 120 can provide administrative users with an opportunity to review, accept, reject, and edit recommendations.

As a nonlimiting example, a call between senior manager, directors and principal engineers can be technical, and can be related primarily to a product release for 90% of the call except for the middle portion of the call where the focus shifted to human resources discussions on possible promotions, performance-improvement-plan, and so on. In this particular recording, a large part is useful information that is appropriate for consumption by junior team members, and circulating this recording to these non-attending recipients can prevent the need to waste time in repeating the same again in a fresh meeting, which also saves data usage, power consumptions, network usage, and provides processing reduction benefits. However, the call recording cannot be forwarded due to the short snippet of sensitive or confidential human resources discussion. The management service 120 can provide granular details on segments of the meeting which are associated with a "Confidential" security label 146 as well as timestamped segments which are tagged with a "Normal" security label 146. This allows the administrative user to accept, reject, and further edit the meeting recording and forward the larger part of the recording to the lower-level audience while also preserving and providing the high-level audience with the full recording.

The management service 120 can be provided to enterprises in a software as a service (SaaS) mode that includes exposing APIs or other programmatic interfaces that provide the service over the network 112. The management service 120 can expose programmatic interfaces such that a user can utilize the various services management service 120 for cloud recording or direct mp4 recordings of meetings. Users can invoke the APIs with parameters that include a link or an uploaded recording, along with information about the meeting data 134. In some examples, the client application 154, the managed application 151, or a console user interface of the management service 120 can be used to extract, identify, or manually enter items of the meeting data 134 as parameters to invoke the programmatic interfaces of the management service 120.

Client devices 106 can invoke a programmatic interface of the management service 120 to verify meeting invitations are appropriate before sending out a broadcast e-mail invitation. Client devices 106 can invoke another programmatic interface of the management service 120 to verify recordings are appropriate before sending out a broadcast e-mail invitation and can receive a recommendation that can be sent out as-is, can be edited and sent out, or the user can invoke the same or another interface to re-verify an edited recording after an initial security assessment of the recording is provided.

The SaaS mode can also be utilized for verifying the fine-tuning of models for any particular industry based on keywords specific to that industry. A user can invoke a programmatic interface with a parameter that provides training data or a network address to training data for keywords, meeting security rules 142, specific sets of security labels 146, and so on. This can configure the management service 120 for enterprise-specific usage. The user can then invoke a programmatic interface to use the meeting security service 127 in association with a meeting invitation, or to use the recording security service 125 in association with a meeting recording.

Figure 2:
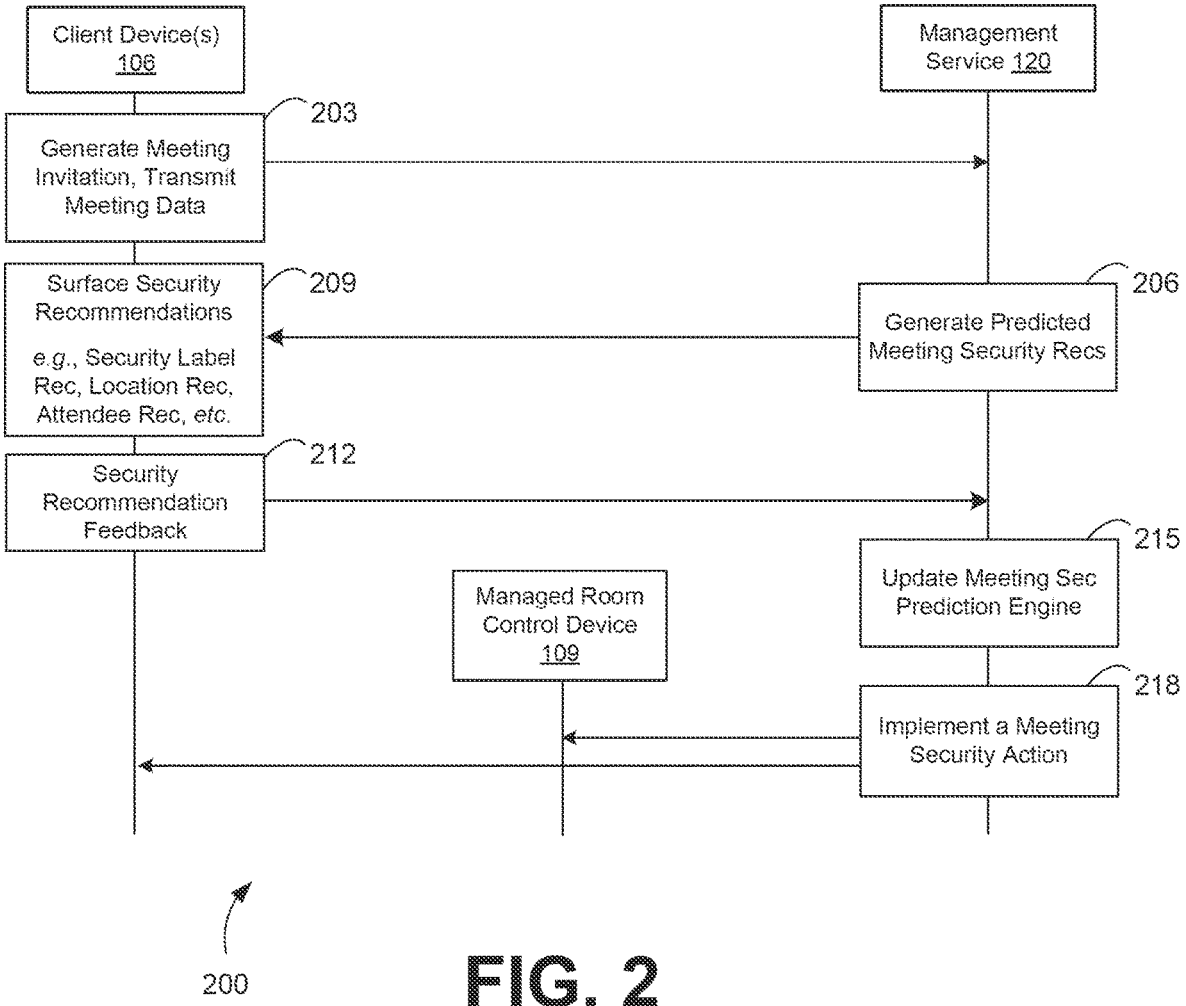
FIG. 2 is a sequence diagram that provides examples of functionality implemented by components of the network environment according to various embodiments of the present disclosure.

Referring next to FIG. 2, shown is a sequence 200 of operations performed in the network environment 100 (FIG. 1). It is understood that the sequence diagram of FIG. 2 provides merely an example of the many different types of interactions that can occur between the depicted components of the network environment 100. As an alternative, the sequence diagram of FIG. 2 may be viewed as depicting an example of elements of a method implemented in the network environment 100 (FIG. 1) according to one or more embodiments. Generally, the management service 120 or any subcomponent can perform actions referred to as being performed by the management service 120 or a particular subcomponent. The client device 106 or any instructions executed thereon can perform actions referred to as being performed by the client device 106 or a particular application.

In block 203, the client device 106 can generate meeting invitation and transmit the meeting data 134 to the management service 120. In the various examples, the meeting invitation and meeting data 134 can be generated using a client application 154, a managed application 151, or both. For example, a client application 154 or a managed application 151 can include an email application, a calendar application, a room booking application, a browser application, or another application that generates a user interface elements through which meeting data 134 can be entered or selected. In an instance in which the client application 154 is used, the managed application 151 can detect the generation of the meeting data 134 and provide it to the management service 120. In some examples, the management service 120 can generate a console user interface accessed through a browser, and transmitting the meeting data 134 can include transmission of user interface commands that select or enter the meeting data 134.

In block 206, the management service 120 can generate predicted meeting security recommendations. The management service 120 can provide the meeting data 134 to a machine-learning-based meeting security recommendation engine of the meeting security service 127. The meeting security service 127 can provide recommendations for a security label 146 and other meeting data 134 to add or modify for the meeting invitation. The management service 120 can transmit the recommendations to the client device 106 for review.

In block 209, the client device 109 can surface the security recommendations through a user interface. The security recommendations can be surfaced by providing a notification with a user interface element that is selected to open a managed application 151 or a client application 154. The notification can be provided in a management dashboard, console user interface, or by an operating system of the client device 106 in various examples. The security recommendations can show each of the recommended additions and other modifications to the meeting data 134 in association with an element that enables the user to accept or reject the recommended modification. While explicit selection of an element can be used to reject a recommendation, the system can consider a lack of acceptance to be a rejection for the purposes of training the meeting security recommendation engine.

In some examples, the user interface through which the meeting invitation is designed can continuously provide information to the management service 120 for analysis using the meeting security service 127. The user interface can be updated to surface recommendations as the meeting invitation is being designed, and prior to sending out the meeting invitation. However, in other examples, the meeting invitation can be transmitted, the management service 120 can extract the meeting data 134 from the invitation, and can provide recommendations to modify the invitation after an initial version is sent.

In block 212, the client device 109 can provide security recommendation feedback. For example, a user can accept or reject a recommended modification to meeting data 134 such as a security label 146 to add or modify, topic data 161 to add or modify, participants 162 to add or modify, and so on. The user can select a user interface element that accepts or rejects the recommended modification, and the client device 106 can transmit this data to the management service 120.

In block 215, the management service 120 can train the meeting security recommendation engine. The management service 120 can provide the security recommendation feedback to train the machine learning engine. As indicated earlier, the management service 120 can consider a lack of acceptance of a recommendation to be a rejection of the recommendation. As a result, if an indication of acceptance is not received for a particular recommendation for a threshold period of time, or by completion of an initial or updated meeting invitation, the management service 120 can provide an indication of rejection for the purposes of training the meeting security recommendation engine.

In block 218, the management service 120 or the client device 106 can implement a meeting security action based on the security recommendation feedback. For example, the management service 120 or the client device 106 can transmit an updated or finalized meeting invitation to participants 162. The management service 120 or the client device 106 can transmit updated information to a booking system used to reserve and configure rooms. This can apply appropriate security profiles to managed room control devices 109 according to the security labels 146 for the meeting. The management service 120 or the client device 106 can transmit updated information to a network conferencing service provided as a cloud service, or to a conferencing application.

Figure 3:
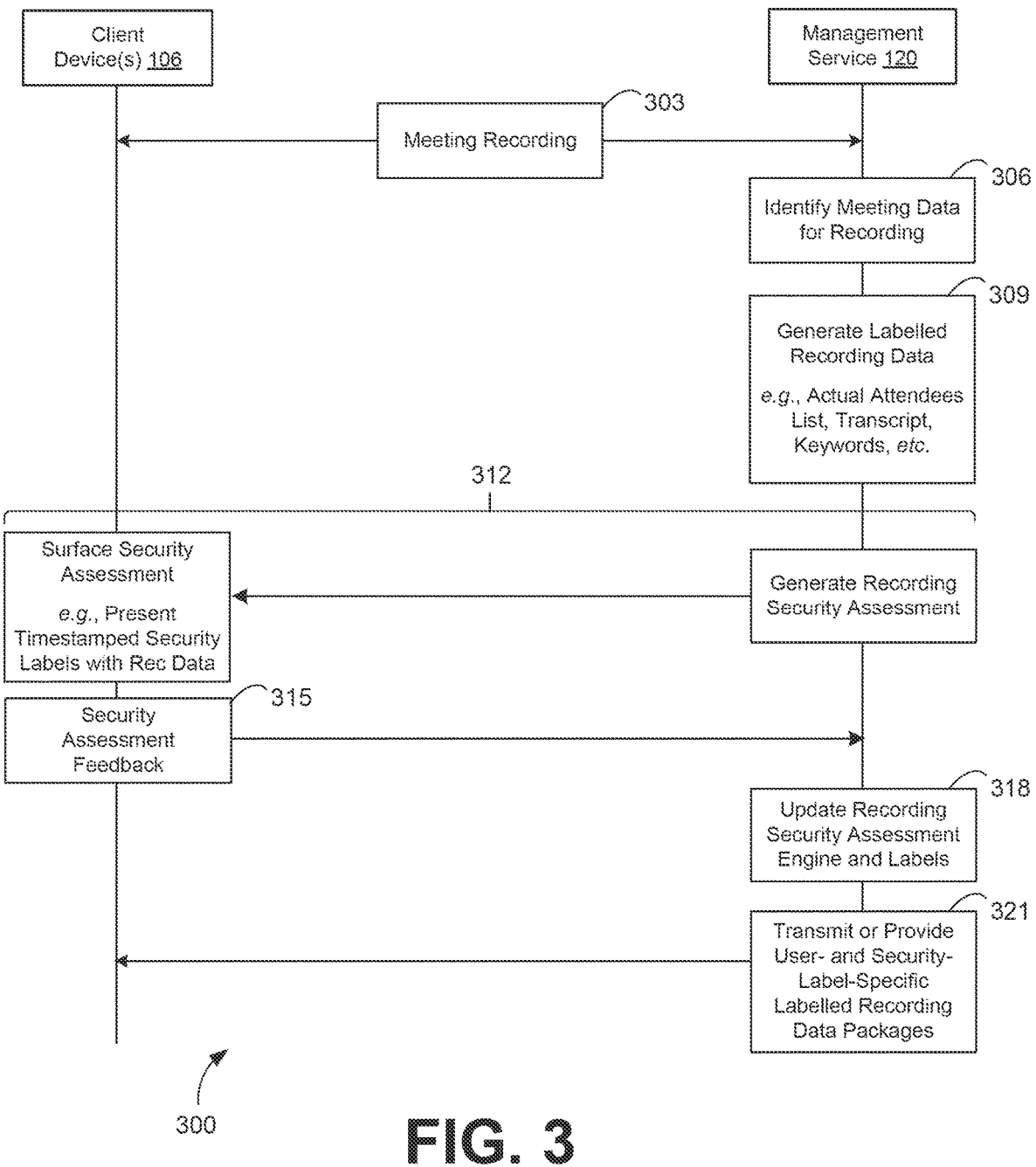
FIG. 3 is a sequence diagram that provides examples of functionality implemented by components of the network environment according to various embodiments of the present disclosure.

Referring next to FIG. 3, shown is a sequence 300 of operations performed in the network environment 100 (FIG. 1). It is understood that the sequence diagram of FIG. 3 provides merely an example of the many different types of interactions that can occur between the depicted components of the network environment 100. As an alternative, the sequence diagram of FIG. 3 may be viewed as depicting an example of elements of a method implemented in the network environment 100 (FIG. 1) according to one or more embodiments. Generally, the management service 120 or any subcomponent can perform actions referred to as being performed by the management service 120 or a particular subcomponent. The client device 106 or any instructions executed thereon can perform actions referred to as being performed by the client device 106 or a particular application.

In block 303, the client device 106, the management service 120, or a third party network conferencing service can generate a meeting recording. If a component other than the management service 120 generates the recording, the management service 120 can receive the meeting recording from that component. The management service 120 can store the meeting recording in the recording data 140 in association with a unique meeting identifier. Additional information can also be provided along with the meeting recording. For example, the actual meeting participants logged into a network conferencing service or application during the meeting, the active participants that actually presented or spoke during the meeting, participants that are confirmed to be in attendance, the actual time of the meeting, and other information can also be provided.

In block 306, the management service 120 can identify meeting data 134 associated with the meeting recording. In some examples, a meeting identifier or other unique identifier can be included with the meeting recording. The management service 120 can identify meeting data 134 stored in association with the same meeting identifier. The meeting data 134 can include the most-recent updated version of the meeting data 134 that is updated according to meeting security recommendations of the meeting security service 127.

In block 309, the management service 120 can generate labelled recording data 141. The management service 120 can provide the meeting recording and the meeting data 134 as inputs to the recording security service 125. The "actual" meeting information such as the actual meeting participants, the actual presenters, actual in-person participants, the actual time of the meeting, and other information can also be provided as input. The recording security service 125 can use this data to generate the labelled recording data 141 as an output.

In block 312, the management service 120 can generate a recording security assessment for presentation to an administrative user. The recording security assessment can provide a summary of the labelled recording data 141. This can provide an indication of information identified under each security label 146. For example, the recording security assessment can provide an image, video snipped, audio snippet, transcript snippet, or attachment that includes sensitive information, along with an indication of the security label 146 applied.

The recording security assessment can provide an indication of the beginning and ending timestamps. In some examples, the recording security assessment interface can provide a full user-specific, group-specific, and security-label-specific recording for review. An indication or list of meeting participants and recording recipients that are permitted to receive and prohibited from receiving each item of security labelled information can also be shown.

The recording security assessment interface can be surfaced by providing a notification with a user interface element that is selected to open a managed application 151 or a client application 154. The notification can be provided in a management dashboard, console user interface, or by an operating system of the client device 106 in various examples. The recording security assessment interface can show each item of labelled sensitive information in association with an element that enables the user to accept, reject, or modify the recommended security label 146, as well as the associated beginning and end timestamps.

In block 315, the client device 109 can provide security assessment feedback. For example, a user can accept, reject, or modify a recommended security label 146 and associated timestamps. The user can select a user interface element that accepts or rejects the recommendation, and the client device 106 can transmit this data to the management service 120.

In block 318, the management service 120 can train the recording security assessment engine of the recording security service 125, as well as update the labelled recording data 141. The management service 120 can provide the security assessment feedback to train the engine. This can modify weights and other parameters of the recording security assessment engine. The management service 120 can also modify the labelled recording data 141 by updating the security labels 146, applying the modified timestamps, and generating updated labelled recording data 141 packages for each participant 162. In this context, participants 162 can include users indicated as expected and actual meeting attendees as well as users indicated as recipients of labelled recording data 141 packages, even if they were not meeting attendees.

In block 321, the management service 120 can transmit or provide labelled recording data 141 packages. The labelled recording data 141 packages can be generated for a particular set of security labels 146 that are permitted for a user, a group, or a custom selected subset of security labels 146 permitted for a user or group. The management service 120 can transmit the labelled recording data 141 packages as email messages, and provide access through a console user interface of the management service 120, a managed application 151, or a client application 154.

Figure 4:
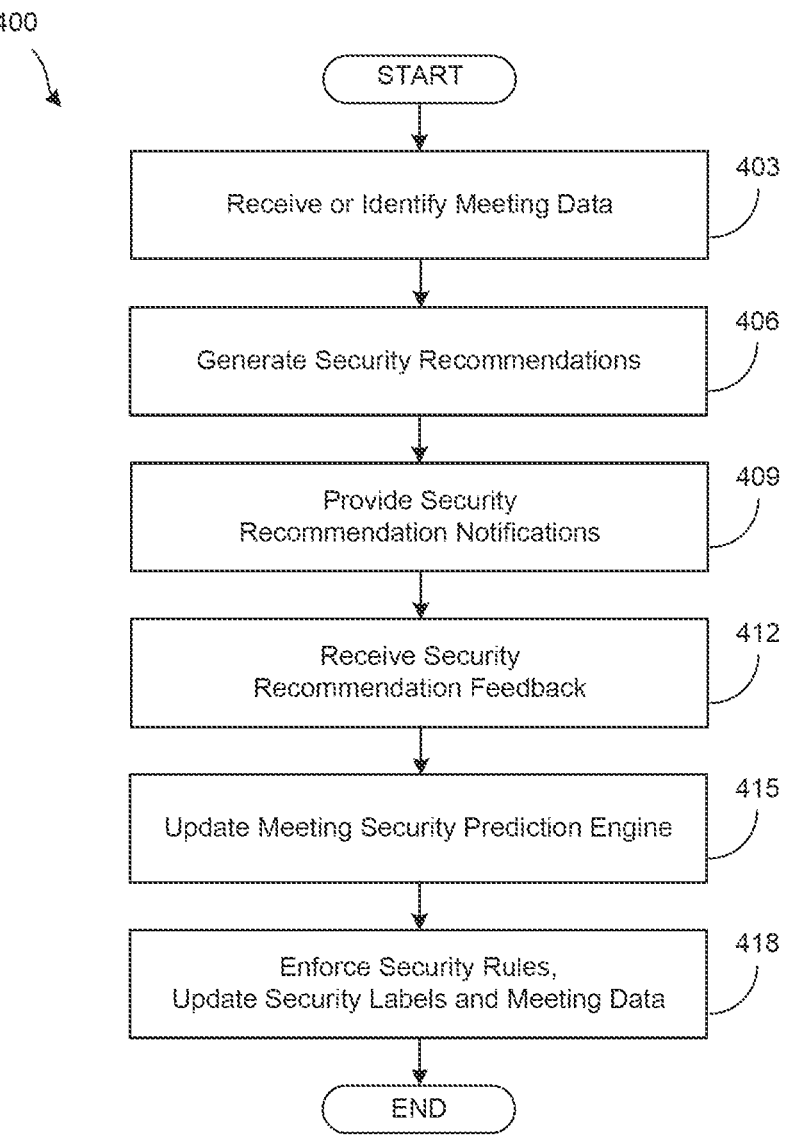
FIG. 4 is a flowchart illustrating one example of functionality implemented as portions of an application executed in a meeting room environment in the network environment according to various embodiments of the present disclosure.

Referring next to FIG. 4, shown is a flowchart 400 that provides one example of the operation of the management service 120 for meeting and recording security management. The flowchart 400 provides merely an example of the many different types of functional arrangements that can be employed to implement the operation of the management service 120. As an alternative, the flowchart 400 can be viewed as depicting an example of elements of a method implemented within the network environment 100.

Beginning with block 403, the management service 120 can receive or identify meeting data 134 for a meeting invitation. In the various examples, the meeting invitation and meeting data 134 can be generated using a client application 154, a managed application 151, or both. For example, a client application 154 or a managed application 151 can include an email application, a calendar application, a room booking application, a browser application, or another application that generates a user interface elements through which meeting data 134 can be entered or selected. In an instance in which the client application 154 is used, the managed application 151 can detect the generation of the meeting data 134 and provide it to the management service 120. In some examples, the management service 120 can generate a console user interface accessed through a browser, and transmitting the meeting data 134 can include transmission of user interface commands that select or enter the meeting data 134.

In block 406, the management service 120 can generate meeting security recommendations. The management service 120 can provide the meeting data 134 to a meeting security recommendation engine of the meeting security service 127. The meeting security service 127 can provide recommendations for a security label 146 and other meeting data 134 to add or modify for the meeting invitation. The management service 120 can transmit the recommendations to the client device 106 for review.

The management service 120 can transmit or generate a notification that includes a user interface element that is selected to open a managed application 151 or a client application 154 on the client device 106. The notification can be generated in a management dashboard, console user interface, or can include an electronic message transmitted to the client device 106. The security recommendations can present each of the recommended additions and other modifications to the meeting data 134 in association with an element that enables the user to accept or reject the recommended modification. While explicit selection of an element can be used to reject a recommendation, the system can consider a lack of acceptance to be a rejection for the purposes of training the meeting security recommendation prediction engine.

In some examples, the user interface through which the meeting invitation is designed can continuously provide information to the management service 120 for analysis using the meeting security service 127. The user interface can be updated to surface recommendations as the meeting invitation is being designed, and prior to sending out the meeting invitation. However, in other examples, the meeting invitation can be transmitted, the management service 120 can extract the meeting data 134 from the invitation, and can provide recommendations to modify the invitation after an initial version is sent.

In block 412, the management service 120 can receive security recommendation feedback. For example, a user can accept or reject a recommended modification to meeting data 134 such as a security label 146 to add or modify, topic data 161 to add or modify, participants 162 to add or modify, and so on. The user can select a user interface element that accepts or rejects the recommended modification, and the client device 106 can transmit this data to the management service 120.

In block 415, the management service 120 can train the meeting security recommendation prediction engine. The management service 120 can provide the security recommendation feedback to train the machine learning engine. As indicated earlier, the management service 120 can consider a lack of acceptance of a recommendation to be a rejection of the recommendation. As a result, if an indication of acceptance is not received for a particular recommendation for a threshold period of time, or by completion of an initial or updated meeting invitation, the management service 120 can provide an indication of rejection for the purposes of training the meeting security recommendation prediction engine.

In block 418, the management service 120 can implement a meeting security action based on the security recommendation feedback. The meeting security action can be identified based on the security recommendation feedback and the meeting security recommendation. For example, the meeting security action can include accepted recommendations and can omit the rejected recommendations. The meeting security actions can also include actions identified by mapping the security labels 146 from the security recommendation feedback and the meeting security recommendation to a set of actions using the meeting security rules 142.

For example, the management service 120 can transmit an updated or finalized meeting invitation to participants 162. The management service 120 can transmit updated information to a booking system used to reserve and configure rooms. This can apply appropriate security profiles to managed room control devices 109 according to the security labels 146 for the meeting. The management service 120 can transmit updated information to a network conferencing service provided as a network service, or to a conferencing application.

Figure 5:
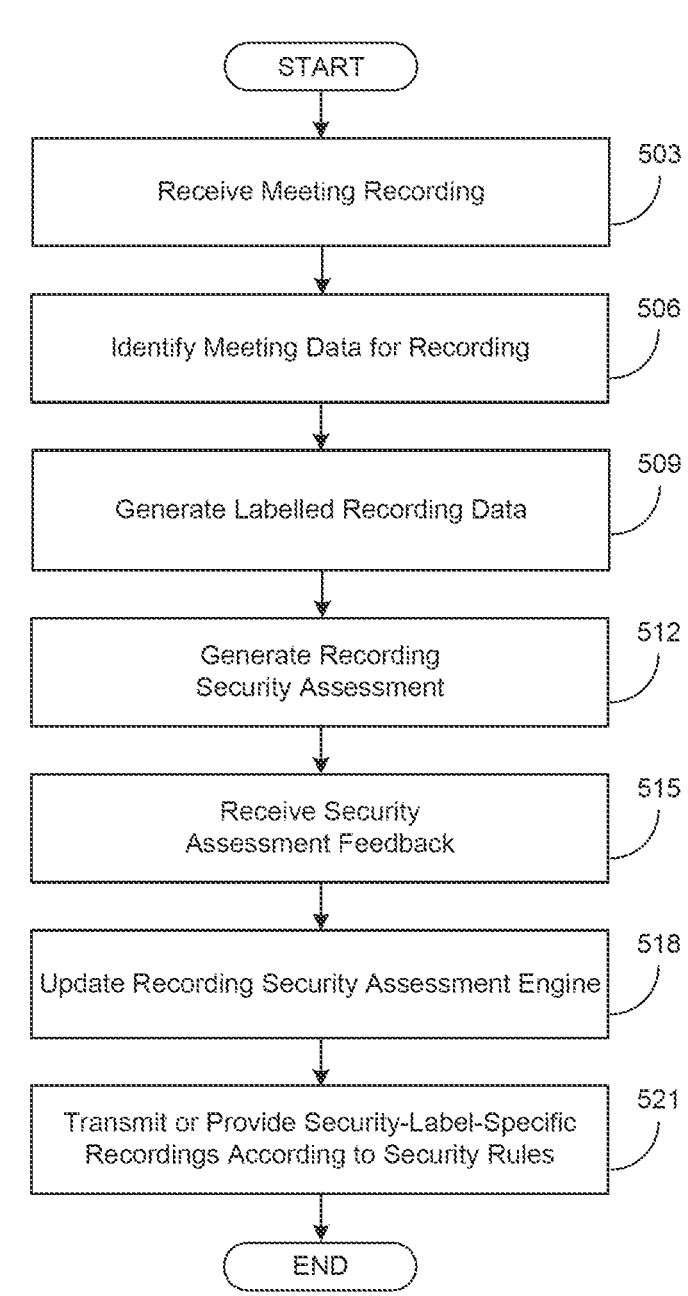
FIG. 5 is a flowchart illustrating one example of functionality implemented as portions of an application executed in a meeting room environment in the network environment according to various embodiments of the present disclosure.

Turning now to FIG. 5, shown is a flowchart that provides one example of the operation of a portion of the management service 120. The flowchart of FIG. 5 provides merely an example of the many different types of functional arrangements that can be employed to implement the operation of the depicted portion of the management service 120. As an alternative, the flowchart of FIG. 5 can be viewed as depicting an example of elements of a method implemented within the network environment 100.

In block 503, the management service 120 can receive a meeting recording. The client device 106, the management service 120, or a third party network conferencing service can generate the meeting recording. If a component other than the management service 120 generates the recording, the management service 120 can receive the meeting recording from that component. The management service 120 can store the meeting recording in the recording data 140 in association with a unique meeting identifier. Additional information can also be provided along with the meeting recording. For example, the actual meeting participants logged into a network conferencing application during the meeting, the active participants that actually presented or spoke during the meeting, participants that are confirmed to be in attendance, the actual time of the meeting, and other information can also be provided.

In block 506, the management service 120 can identify meeting data 134 associated with the meeting recording. In some examples, a meeting identifier or other unique identifier can be included with the meeting recording. The management service 120 can identify meeting data 134 stored in association with the same meeting identifier. The meeting data 134 can include the most-recent updated version of the meeting data 134 that is updated according to meeting security recommendations of the meeting security service 127.

In block 509, the management service 120 can generate labelled recording data 141. The management service 120 can provide the meeting recording and the meeting data 134 as inputs to the recording security service 125. The "actual" meeting information such as the actual meeting participants, the actual presenters, actual in-person participants, the actual time of the meeting, and other information can also be provided as input. The recording security service 125 can use this data to generate the labelled recording data 141 as an output.

In block 312, the management service 120 can generate a recording security assessment for presentation to an administrative user. A recording security assessment can provide a summary of the labelled recording data 141. This can provide an indication of information identified under each security label 146. For example, the recording security assessment can provide an image, video snipped, audio snippet, transcript snippet, or attachment that includes sensitive information, along with an indication of the security label 146 applied.

The recording security assessment can provide an indication of the beginning and ending timestamps. In some examples, the recording security assessment interface can provide a full user-specific, group-specific, and security-label-specific recording for review. An indication or list of meeting participants and recording recipients that are permitted to receive and prohibited from receiving each item of security labelled information can also be shown.

A recording security assessment interface can be surfaced by providing a notification with a user interface element that is selected to open a managed application 151 or a client application 154. The notification can be provided in a management dashboard, console user interface, or by an operating system of the client device 106 in various examples. The recording security assessment interface can show each item of labelled sensitive information in association with an element that enables the user to accept, reject, or modify the recommended security label 146, as well as the associated beginning and end timestamps.

In block 515, the management service 120 can receive security assessment feedback from the client device 106. For example, a user can accept, reject, or modify a recommended security label 146 and associated timestamps. The user can select a user interface element that accepts or rejects the recommendation, and the client device 106 can transmit this data to the management service 120.

In block 518, the management service 120 can train the recording security assessment engine of the recording security service 125, as well as update the labelled recording data 141. The management service 120 can provide the security assessment feedback to train the engine. This can modify weights and other parameters of the recording security assessment engine. The management service 120 can also modify the labelled recording data 141 by updating the security labels 146, applying the modified timestamps, and generating updated labelled recording data 141 packages for each participant 162. In this context, participants 162 can include users indicated as expected and actual meeting attendees as well as users indicated as recipients of labelled recording data 141 packages, even if they were not meeting attendees.

In block 521, the management service 120 can transmit or provide labelled recording data 141 packages. The labelled recording data 141 packages can be generated for a particular set of security labels 146 that are permitted for a user, a group, or a custom selected subset of security labels 146 permitted for a user or group. The management service 120 can transmit the labelled recording data 141 packages as email messages, and provide access through a console user interface of the management service 120, a managed application 151, or a client application 154.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power.

Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Flowcharts and the sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams can show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
at least one computing device comprising at least one processor and at least one memory; and
machine-readable instructions stored in the memory that, when executed by the at least one processor, cause the at least one computing device to at least:
identify meeting recording associated with a meeting identifier;
retrieve meeting data based on the meeting identifier;
provide the meeting recording and the meeting data as input to a machine learning engine of a meeting security service to generate labelled recording data comprising a plurality of meeting sections, wherein at least one security label is applied to at least one meeting section, and wherein the labelled recording data specifies a beginning timestamp and an ending timestamp for each meeting section;
generate, based at least in part on the labelled recording data from the machine learning engine of the meeting security service, a user-specific recording package for a user account, the user-specific recording package comprising a subset of the plurality of meeting sections, wherein generating the user-specific recording package comprises extracting, from the meeting recording, only those meeting sections whose security labels are included in a set of security labels approved for the user account and excluding at least one meeting section having a security label not included in the set of security labels approved for the user account; and
transmit the user-specific recording package to a client device associated with the user account.

2. The system of claim 1, wherein the meeting recording is associated with at least one of: an in-person meeting, and a network conferencing meeting.

3. The system of claim 1, wherein the meeting data comprises at least one of: a meeting topic, a meeting location, a user-selected security label, an attachment, and a network link.

4. The system of claim 1, wherein the instructions further cause the at least one computing device to at least:
generate, based at least in part on the labelled recording data from the machine learning engine of the meeting security service, a recording security assessment that shows associations between the at least one meeting section with the at least one security label.

5. The system of claim 4, wherein the instructions further cause the at least one computing device to at least:
receive security assessment feedback that accepts or modifies the labelled recording data.

6. The system of claim 5, wherein the instructions further cause the at least one computing device to at least:
update the machine learning engine of the meeting security service based at least in part on the security assessment feedback.

7. The system of claim 1, wherein the meeting data comprises expected data generated prior to the meeting, and updated data updated to reflect information confirmed during a meeting, the updated data comprising at least one of: an updated participant data, updated topic data, and updated timing data.

8. A method, comprising:
receiving, by a meeting security service, a meeting recording associated with a meeting identifier and meeting data associated with the meeting identifier;
providing, by the meeting security service, the meeting recording and the meeting data as input to a machine learning engine to generate labelled recording data comprising a plurality of meeting sections, wherein at least one security label is applied to at least one meeting section, and wherein the labelled recording data specifies a beginning timestamp and an ending timestamp for each meeting section; and generating, by the meeting security service, based at least in part on the labelled recording data from the machine learning engine of the meeting security service, a user-specific recording package for a user account, the user-specific recording package comprising a subset of the plurality of meeting sections, wherein generating the user-specific recording package comprises extracting, from the meeting recording, only those meeting sections whose security labels are included in a set of security labels approved for the user account and excluding at least one meeting section having a security label not included in the set of security labels approved for the user account, wherein the meeting security service provides the user account with access to the user-specific recording package.

9. The method of claim 8, wherein the meeting recording is associated with at least one of: an in-person meeting, and a network conferencing meeting.

10. The method of claim 8, wherein the meeting data comprises at least one of: a meeting topic, a meeting location, a user-selected security label, an attachment, and a network link.

11. The method of claim 8, further comprising:

generating, based at least in part on the labelled recording data from the machine learning engine of the meeting security service, a recording security assessment that shows associations between the at least one meeting section with the at least one security label.

12. The method of claim 11, further comprising:

receiving, by the meeting security service, security assessment feedback that accepts or modifies the labelled recording data.

13. The method of claim 12, further comprising:

updating the machine learning engine of the meeting security service based at least in part on the security assessment feedback.

14. The method of claim 8, wherein the meeting data comprises expected data generated prior to the meeting, and updated data updated to reflect information confirmed during a meeting, the updated data comprising at least one of: an updated participant data, updated topic data, and updated timing data.

15. A non-transitory, computer-readable medium, comprising machine-readable instructions that, when executed by at least one processor of at least one computing device, cause the at least one computing device to at least:

receive a meeting recording associated with a meeting identifier and meeting data associated with the meeting identifier;

provide the meeting recording and the meeting data as input to a machine learning engine of a meeting security service to generate labelled recording data comprising a plurality of meeting sections, wherein at least one security label is applied to at least one meeting section; and generate, based at least in part on the labelled recording data from the machine learning engine of the meeting security service, a user-specific recording package for a user account, the user-specific recording package comprising a subset of the plurality of meeting sections, wherein generating the user-specific recording package comprises extracting, from the meeting recording, only those meeting sections whose security labels are included in a set of security labels approved for the user account and excluding at least one meeting section having a security label not included in the set of security labels approved for the user account, wherein the meeting security service provides the user account with access to the user-specific recording package.

16. The non-transitory, computer-readable medium of claim 15, wherein the meeting recording is associated with at least one of: an in-person meeting, and a network conferencing meeting.

17. The non-transitory, computer-readable medium of claim 15, wherein the instructions further cause the at least one computing device to at least:

generate, based at least in part on the labelled recording data from the machine learning engine of the meeting security service, a recording security assessment that shows associations between the at least one meeting section with the at least one security label.

18. The non-transitory, computer-readable medium of claim 17, wherein the instructions further cause the at least one computing device to at least:

receive security assessment feedback that accepts or modifies the labelled recording data.

19. The non-transitory, computer-readable medium of claim 18, wherein the instructions further cause the at least one computing device to at least:

update the machine learning engine of the meeting security service based at least in part on the security assessment feedback.

20. The non-transitory, computer-readable medium of claim 15, wherein the meeting data comprises expected data generated prior to the meeting, and updated data updated to reflect information confirmed during a meeting, the updated data comprising at least one of: an updated participant data, updated topic data, and updated timing data.

* * * * *